United States Patent [19]

Luperti et al.

[11] 4,121,716
[45] Oct. 24, 1978

[54] DOUBLES AND THICKNESS DETECTOR AND SORTER

[75] Inventors: Harry E. Luperti, Wilton; Robert Irvine, Riverside; Robert S. Salzman, Stamford, all of Conn.

[73] Assignee: Pitney-Bowes, Inc., Stamford, Conn.

[21] Appl. No.: 859,867

[22] Filed: Dec. 12, 1977

[51] Int. Cl.² .............................................. B07C 5/09
[52] U.S. Cl. ................................... 209/564; 209/603; 209/604; 209/657; 271/263; 33/143 L
[58] Field of Search .................... 209/82, 88 S, 74 M; 271/263; 33/147, 148; 340/259; 33/143 L, DIG. 3

[56] References Cited

U.S. PATENT DOCUMENTS

| 2,632,545 | 3/1953 | Schubert | 209/88 S |
|---|---|---|---|
| 3,176,981 | 4/1965 | Vandeman | 271/263 |
| 3,826,487 | 7/1974 | Förster et al. | 271/263 |
| 3,954,260 | 5/1976 | Morello et al. | 271/263 |

*Primary Examiner*—Allen N. Knowles
*Attorney, Agent, or Firm*—Peter Vrahotes; William D. Soltow, Jr.; Albert W. Scribner

[57] ABSTRACT

An automatic doubles and sheet thickness detector is disclosed that operates by comparing consecutive sheet materials that are delivered to a rotating drum.

The consecutive sheet materials pass under two spaced apart rollers that are movably biased against the drum. If a sheet of greater thickness or a double sheet passes under one of the rollers, it will be displaced a greater distance from the drum surface than the other roller. This displacement is magnified by means of elongated pivot arms, which are attached to each roller. The magnified movement is detected by means of an optical arrangement comprising a light source, a photodetector, and a pair of mirrors. The mirrors are each secured to a distal end of a respective pivot arm. The light source casts a beam that reflects off each mirror towards the photodetector. When one of the arms is displaced more than its companion arm, such as when a double or thicker sheet lies between one of the rollers and the drum, the light beam will not be directed towards the photodetector. If each arm is displaced a like amount, as when consecutive single sheets are of like thickness, the photodetector will receive the reflected light, and therefore indicate a proper sheet.

20 Claims, 3 Drawing Figures

DOUBLES AND THICKNESS DETECTOR AND SORTER

This invention relates to a sheet handling apparatus, and more particularly to a sheet handling apparatus for detecting a double or thicker sheet in a quantity of sheet materials.

BACKGROUND OF THE INVENTION

Heretofore, many devices have been proposed for separating or detecting double sheets in a delivered quantity of sheet materials. Such apparatuses are generally most useful for dealing with banknotes, checks and treasury bills. As such, these devices are usually found in the banking industry.

The prior devices, however, are not capable of automatically adjusting for different thicknesses of material. In other words, once having been set for a standard sheet thickness, e.g., checks, the prior machines could not then be used for banknotes without a manual resetting of the thickness adjustment.

The present invention seeks to provide an automatic or universal apparatus for detecting sheet materials of various thicknesses and of multiple quantities.

The present invention is generally insensitive to changes in speed such that the apparatus could be speeded up or slowed down to accommodate the user's particular requirements.

SUMMARY OF THE INVENTION

This invention pertains to an automatic doubles and sheet thickness detector. Sheet materials are delivered to a rotating drum in a consecutive (seriatim) fashion. The sheet materials pass under two spaced apart rollers that are movably biased towards the drum. These rollers are respectively attached to a pair of elongated arms that pivot in response to materials passing between the respective rollers and the drum. Secured to the distal ends of each arm is a mirror. A light source is mounted to project a beam of light at a first one of the mirrors. The mirrors are arranged such that the light beam will reflect off the first mirror towards the second of the two mirrors. The beam of light will then reflect off the second mirror towards a photodetector.

As consecutive sheets are fed to the drum and pass under the rollers, a double or thicker sheet disposed between one of the rollers will be compared to a single sheet of proper thickness disposed on the other respective roller. This is accomplished by the fact that each roller will move a different distance away from the drum in order to accommodate for the different thicknesses of the two consecutive sheet materials. This will in turn cause one arm to pivot a greater degree than the other respective arm. The light beam projected at, and reflected by the mirrors, will then be reflected away from the photodetector. This will indicate that an improper thickness of sheet, or a multiple sheet has been delivered to the drum.

A gate disposed in a discharge vicinity of the drum will receive a signal from the photodetector in order to direct the sheet material toward a reject or an acceptance path.

The present invention is very sensitive to even the most minute changes in sheet thickness, because of the large mechanical advantage obtained from the pivoting of the elongated arms.

Consideration of the photodetector signal is independent of the speed of the drum, via the use of a timing wheel. Thus, the apparatus is insensitive to changes in speed, and indeed can be run at varying speeds.

Other detectors are provided about the periphery of the drum to detect other abnormalities in the sheet handling, such as slightly overlapping sheets, or a stream feed condition. Logic circuitry is provided to interpret the various detector signals in order to control the gate.

It is an object of this invention to provide an improved sheet handling device;

It is another object of the invention to provide an automatic or universal doubles or thickness detecting apparatus for sheet material;

It is a futher object of this invention to provide a doubles or thickness detecting sheet handling apparatus that is very sensitive and accurate.

These and other objects of the invention will become more apparent and will be better understood with reference to the following detailed description taken in conjunction with the accompanying drawings, in which.

DETAILED DESCRIPTION

Generally speaking, the invention is for a doubles or thickness detecting sheet handling apparatus. The system comprises means for delivering consecutive sheet materials to a rotating drum, which receives and discharges each sheet as it rotates. A first and a second pivot arm are disposed adjacent the drum. The first arm is disposed about an incoming section of the drum, and the second arm is disposed about a discharge section of the drum. The arms are elongated and spaced apart from each other. Each arm supports a mirror on a distal end, and a roller on an opposite end. The arms are each pivotably mounted between their roller and mirror ends. Each respective roller is biased into contact with the drum, and is movable with respect to the drum in response to sheet material passing between the drum and itself.

A light source is mounted to project a light beam at the mirror carried by the first arm. The arms are arranged in such a fashion, that the beam of light will reflect off the first arm mirror towards the mirror carried by the second arm. The light beam will reflect off this second arm mirror towards a photodetector. The photodetector will provide a signal in response to the light beam.

When consecutive sheets pass between the respective rollers, a double or thicker sheet disposed between one of the rollers and the drum, will cause that roller to move a greater distance than the other roller with a single sheet of proper thickness disposed between it and the drum. This greater movement will be translated into a greater pivoting of one of the arms with respect to the other arm. This in turn will cause the light beam to reflect off the mirrors such that the photodetector will not receive the light beam. This will then indicate that a double or thicker sheet is disposed between one of the rollers and the drum. The improper sheet material can then be directed towards a reject path by a signal from the photodetector.

Figure 1:
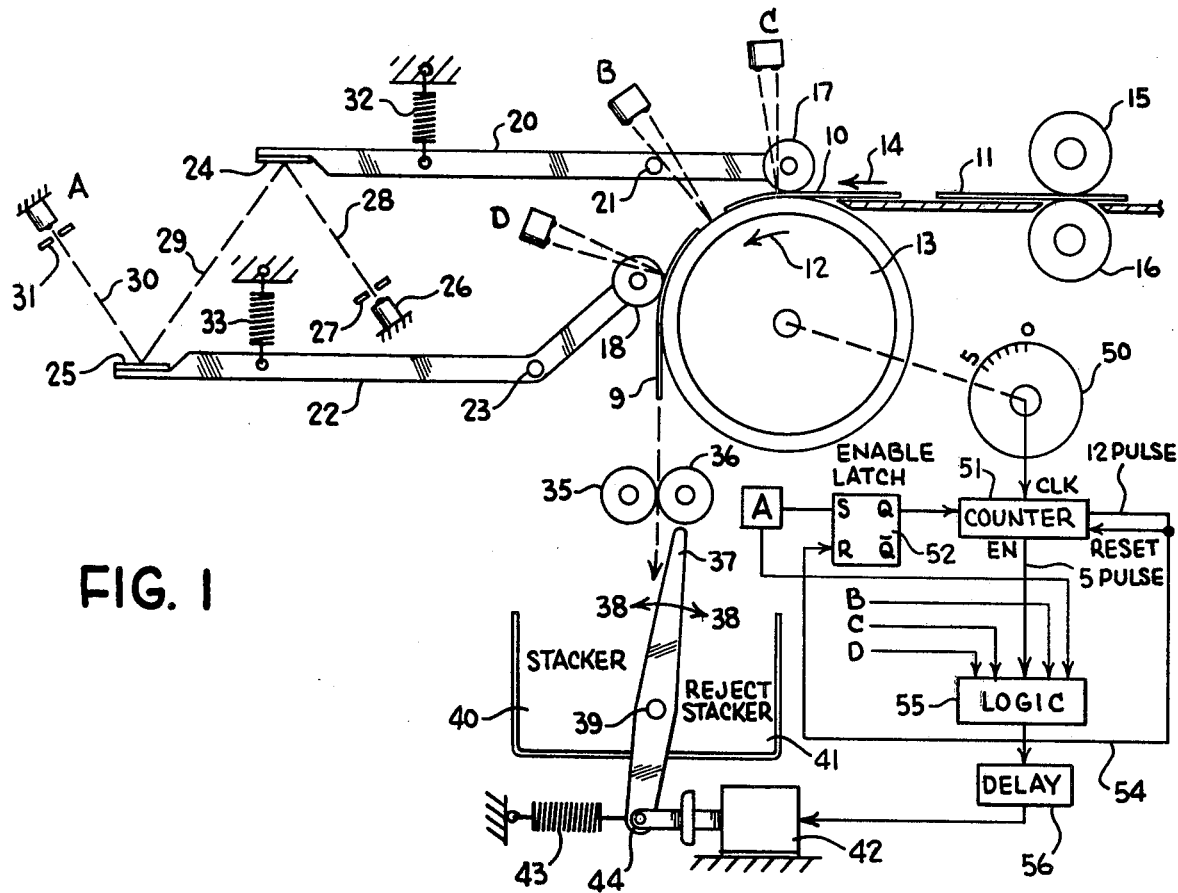
FIG. 1 is a schematic view of the sheet handling thickness and doubles detecting apparatus of this invention.

Now referring to FIG. 1, consecutive sheets 9, 10 and 11, respectively, are being delivered (arrow 14) to a rotating (arrow 12) drum 13, via a pair of feed rollers 15 and 16.

The first sheet 9 initially passes under a first roller 17 and then under a second roller 18. The first roller 17 is rotatably mounted to a pivot arm 20 that pivots about pivot point 21. The second roller 18 is rotatably mounted upon pivot arm 22, which pivots about pivot point 23.

The pivot arms 20 and 22, respectively, support mirrors 24 and 25 on their distal ends. An LED 26 and a columnator 27 throw a beam of light 28 upon the mirror 24 of the first arm 20. The beam 28 is caused to reflect off mirror 24, casting a beam 29 upon mirror 25 of arm 22. Mirror 25 reflects beam 29 casting beam 30 towards columnator 31 and photodetector "A."

The arms 20 and 22 are respectively biased by springs 32 and 33, such that rollers 17 and 18 are respectively urged against drum 13.

When the sheet materials leave the drum 13, they pass between two discharge rollers 35 and 36. A pivotable gate 37 adjacent rollers 35 and 36 can pivot back and forth (arrows 38) about pivot 39, as shown. If the sheet material being discharged is a single sheet of the proper thickness, the gate 37 will direct it along an acceptance path, or to an acceptance bin 40. If the sheet being ejected is a double, or one which is of improper thickness, the gate 37 will pivot to direct the material to a reject path or reject bin 41.

The gate 37 is connected to, and is controlled by a solenoid 42 and a spring 43, respectively. The solenoid 42 pulls on gate 37 about its end 44, thus causing it to pivot about point 39. The spring 43 offers a return to the other pivot position.

Three photodetector devices "B," "C," and "D" are depicted about drum 13. Detector "B" is disposed halfway between rollers 17 and 18, and detects the gap between sheets 9 and 10.

Detector "C" is disposed adjacent the first roller 17, and detects incoming sheet material.

Detector "D" is disposed adjacent discharge roller 18 (second roller), and detects the sheet material leaving the drum 13.

All the detectors give a signal consistant with the detection of sheet material at their respective locations. Each detector "B," "C," and "D" comprises a unitized LED and photodetector element.

A timing wheel 50 is connected to drum 13, and rotates therewith. The timing wheel 50 keeps the same speed as the drum 13.

A counter 51 is electrically connected to the timing wheel 50, and counts the pulses provided by the timing wheel 50.

The counter 51 is triggered to start counting when it receives a pulse from the enable latch 52 (R-S FLIP FLOP) via the photodetector "A" signal. When the counter 51 reaches a predetermined count (approximately five pulses) equal to the time it takes the drum 13 to turn through an arc equal to half the arc between rollers 17 and 18, the counter 51 will actuate the logic 55. Logic 55 receives the signals from all the detectors "A," "B," "C" and "D," respectively, as illustrated. The logic circuit 55 is shown in more detail in FIG. 2, and will be explained in more detail hereinafter, with reference to this figure.

When the logic circuit 55 has processed the various detector signals, it sends a signal to solenoid 42 to pull upon gate 37, and direct the discharging material to the reject bin.

A delay 56 is disposed between the logic circuit 55 and solenoid 42, to allow a discharging sheet (e.g., sheet 10) enough time to clear the drum 13 and enter rollers 35 and 36. After the counter 51 sends a signal to the logic 55 it counts an additional number of pulses to send a reset signal to counter 51 and latch 52 via line 54. This reset signal clears the counter and resets the latch for the next sheet cycle.

OPERATION OF THE INVENTION

Figure 1A:
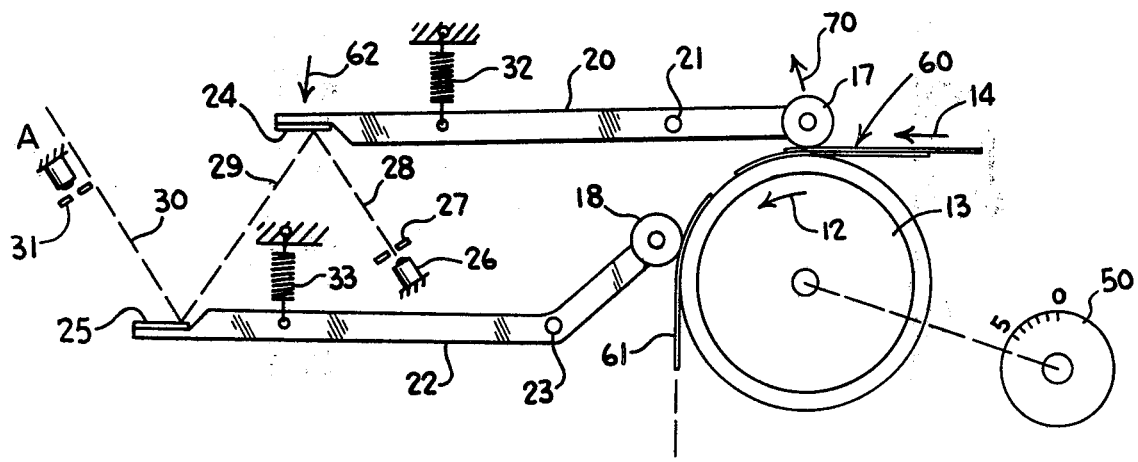
FIG. 1a is a partial view of the schematic of FIG. 1, illustrating the apparatus detecting a doubles condition.

The operation of the invention will be explained with reference to FIGS. 1, 1a, and 2. Where applicable, like elements have retained the same designation for purposes of continuity.

FIG. 1 shows the introduction of single sheet materials 9, 10 and 11, respectively, of proper thickness. As such, rollers 17 and 18 move substantially the same distance, as sheets 9 and 10, respectively, pass therebetween.

What is happening in effect, is that roller 18 is sensing the thickness of sheet 9, while roller 17 is likewise sensing the thickness of sheet 10. The movement of rollers 17 and 18 is pivotably conveyed to the mirrors 24 and 25, respectively, by arms 20 and 22. Arms 20 and 22 are highly elongated, such that the motion of the rollers 17 and 18 are respectively magnified many times by the induced mechanical advantage. In other words, a slight movement of either roller 17 or 18 will result in a very noticeable movement of mirror 24 and 25, respectively. This can best be seen with reference to FIG. 1a, where a double sheet 60 has moved (arrow 70) roller 17 a greater distance than single sheet 61 has moved roller 18.

As can be seen, mirror 24 has moved downwardly (arrow 62) a greater distance than roller 17 has moved up (arrow 70). As aforementioned, this is due to the mechanical advantage of the pivotable, elongated lever arms.

During normal operation (FIG. 1) the rollers 17 and 18 move substantially equal distances from the surface of drum 13 in response to single sheets of proper thickness. As such, the mirrors 24 and 25 remain parallel with each other and light beam 30 will be detected by photodetector "A."

When either roller 17 or 18 senses a double sheet (such as sheet 60 in FIG. 1a) or a sheet of improper thickness, the mirrors 24 and 25 will go out of parallelism with respect to each other, and light beam 30 will not be detected by photodetector "A." Photodetector "A" will now provide a signal that will allow gate 37 to direct double sheets 60 to the reject bin 41.

Thus, it will be seen that each subsequently fed sheet will be compared with a prior sheet that has been fed to rotating drum 13. In other words, the invention is continuously comparing consecutively delivered sheets with their immediately prior delivered sheet, now disposed upon the drum.

The sequence of the operation from delivery to discharge of the sheets, will now be further explained with reference to the logic circuitry shown in FIG. 2.

Figure 2:
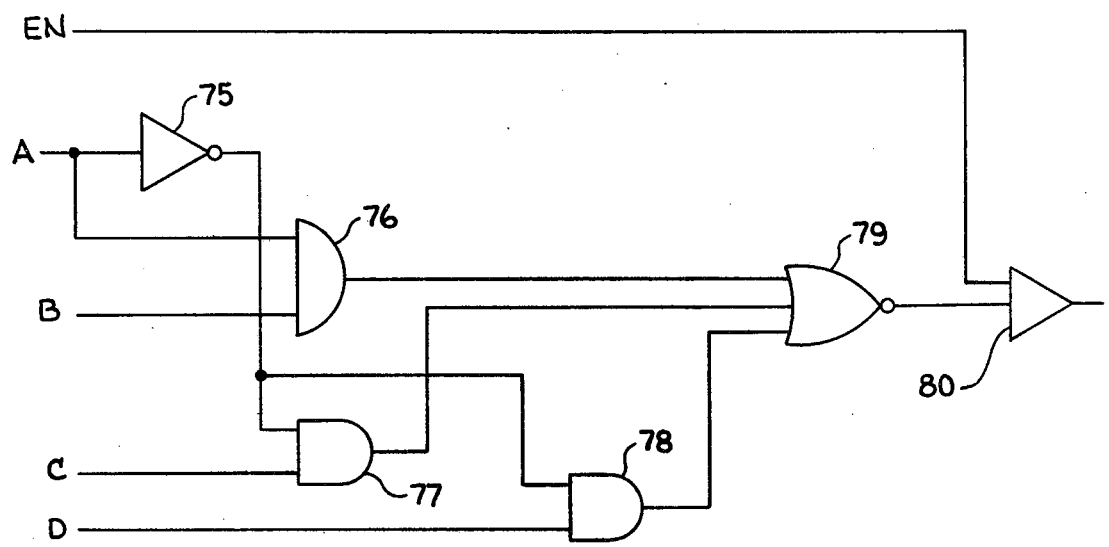
FIG. 2 is a schematic view of the logic circuitry for the inventive apparatus shown in FIG. 1.

The logic circuit 55 receives signals "A," "B," "C" and "D" as shown in FIG. 2. Signal "A" is fed to an inverter 75 and an AND gate 76. Signal "B" is also fed to AND gate 76. Signal "C" is fed to an AND gate 77 along with the inverted "A" signal from inverter 75. Signal "D" is fed to a third AND gate 78, which also receives an inverted "A" signal from the inverter 75.

The outputs from the three AND gates 76, 77 and 78 are each fed to a NOR gate 79, whose output actuates solenoid 42.

The logic circuit 55 also contains a gate 80 to pass on the output signal from the NOR gate 79 to the solenoid 42 in response to the counter signal. A delay 56 is needed to allow a double or improper thickness of sheet disposed under roller 17, enough time to be discharged by the drum 13, and reach discharge rollers 35 and 36.

Detector "B" measures the gap between consecutive sheets, and in case of a stream feed will detect the overlap. A signal from detector "B" will be processed by the logic circuit 55 to reject the sheets, when the counter 51 output enables the output of NOR gate 79.

As should be obvious, the initial 5 pulse counter 51 output corresponds to the time the leading edge of a sheet reaches the approximate mid point between roller 17 and 18 in order that detector "B" can test for a stream feed condition.

Detectors "C" and "D" are not needed during the many cycles between the first and last sheet of a batch of sheets. Their purpose is for processing the first and last sheets of a run, such that the last sheet, for example, will not be automatically dumped into the reject bin 41.

The following truth table describes the operation of the logic circuit 55 of FIG. 2 (all the most common conditions are described):

| Condition | A | B | C | D | 79 Output | 37 Condition |
|---|---|---|---|---|---|---|
| 1st Sheet Entering | 0 | 1 | 0 | 1 | 0 | Stacker |
| 2 Sheets Normal Condition | 1 | 1 | 0 | 0 | 0 | Stacker |
| Last Sheet Leaving | 0 | 1 | 1 | 0 | 0 | Stacker |
| Empty | 1 | 1 | 1 | 1 | 1 | Reject |
| Overlap | 1 | 0 | 0 | 0 | 1 | Reject |
| Double | 0 | 1 | 0 | 0 | 1 | reject |

0 is off
1 is on

Obviously, many changes can be fashioned in the logic and operation of the system to suit the user of this apparatus. The particular logic displayed herein is meant to be just one possible example of how this apparatus may be operated. The objects of the invention have been shown: sensitivity and accuracy of the pivot arms 20 and 22 to sense doubles and improper thickness of the sheet material, and the timing wheel which allows for sensing conditions upon the drum at proper intervals of time without concern for changes of speed. Also, the present invention is novel because it can be used for different thicknesses of materials without need for adjustments between runs.

Having thus described the invention, what is desired to be protected by Letters Patent is presented by the following appended claims.

What is claimed is:

1. A double or thickness detecting sheet handling apparatus, comprising:
    means for delivering consecutive sheet materials to a drum;
    a rotatable drum for receiving and discharging each sheet material as the drum is caused to rotate;
    first and second pivotable, elongated, spaced apart arms disposed adjacent the rotatable drum, each arm having a mirror supported on a distal end thereof and a roller carried on an opposite end thereof, each arm being pivotably mounted between the mirror and roller ends, each respective roller being in biased contact with said drum and being respectively movable with respect to said drum in response to sheet material passing between said drum and said respective roller;
    a light source mounted to project a light beam at the mirror carried by said first arm, said arms being arranged such that the light beam projected at said first arm mirror will reflect off said first arm mirror towards the mirror carried by said second arm, and reflect off said second arm mirror towards a photodetector; and
    a photodetector mounted to receive the light beam reflected off said second arm mirror and provide an indicator signal in response thereto, whereby as consecutive sheets pass between said respective rollers, a double or thicker sheet disposed between one of said respective rollers and said drum will cause that roller to move a greater distance than the other respective roller with a single sheet of proper thickness disposed between it and the drum, thereby causing one of said arms to pivot a greater amount than the other respective arm, thereby causing the light beam to reflect off said respective first and second mirrors such that said photodetector will not receive said light beam, thereby indicating a double or thicker sheet disposed between one of said rollers and said drum.

2. The sheet handling apparatus of claim 1, further comprising a timing wheel mounted in rotative engagement with said drum for timing the consideration of an indicator signal from said photodetector at given intervals with respect to detection of a sheet between said first arm roller and said drum.

3. The sheet handling apparatus of claim 2, further comprising gap detecting means for detecting a gap between consecutive sheet materials, said gap detecting means being disposed adjacent said drum between said spaced apart arms, said gap detecting means providing a gap indicating signal, said gap indicating signal being considered at given intervals in accordance with operation of said timing wheel.

4. The sheet handling apparatus of claim 3, further comprising a gate means disposed adjacent said drum at a discharge section thereof, for directing double or thicker sheet material toward a reject path, and for directing proper sheet material toward an acceptance path.

5. The sheet handling apparatus of claim 4, wherein said gate means further comprises a solenoid and spring return control apparatus connected to said gate means for moving said gate means between a reject and an acceptance path position.

6. The sheet handling apparatus of claim 4, further comprising incoming detector means for detecting incoming sheet material to said drum, said incoming detector being disposed adjacent said drum in a vicinity of said first arm roller, and a discharge detector means for detecting sheet material being discharged from said drum, said discharge detector means being disposed adjacent said drum in a vicinity of said second arm roller, said incoming and said discharge detector means providing a signal indicative of their respective sheet material detection.

7. The sheet handling apparatus of claim 6, further comprising a counter connected to said timing wheel for counting a number of pulses from said timing wheel.

8. The sheet handling apparatus of claim 7, further comprising enabling means connected to said counter and the photodetector, said enabling means actuating said counter to pass on a control signal when said counter has reached a predetermined count.

9. The sheet handling apparatus of claim 8, further comprising logic means connected to said gate means and said counter for processing the various received detector signals for providing a signal to control the gate means for directing the sheet material toward a reject or an acceptance path.

10. The sheet handling apparatus of claim 9, further comprising a delay connected between said logic means and said gate means for delaying said signal from said logic means to said gate means in order to allow enough time for sheet material disposed between said first arm roller and said drum to be discharged by said drum.

11. An automatic double or thickness detecting sheet handling apparatus, comprising:
   means for delivering consecutive sheet materials to a drum;
   a rotatable drum for receiving and discharging each sheet material as the drum is caused to rotate;
   first and second pivotable, elongated, spaced apart arms, said first arm disposed adjacent the rotatable drum at an incoming section thereof and said second arm disposed adjacent said drum at a discharge section thereof, each arm having a mirror supported on a distal end thereof and a roller carried on an opposite end thereof, each arm being pivotably mounted between the mirror and roller ends, each respective roller being in biased contact with said drum and being respectively movable with respect to said drum in response to sheet material passing between said drum and said respective roller;
   a light source mounted to project a light beam at the mirror carried by said first arm, said arms being arranged such that the light beam projected at said first arm mirror will reflect off said first arm mirror towards the mirror carried by said second arm, and reflect off said second arm mirror towards a photodetector; and
   a photodetector mounted to receive the light beam reflected off said second arm mirror and provide an indicator signal in response thereto, whereby as consecutive sheets pass between said respective rollers, a double or thicker sheet disposed between one of said respective rollers and said drum will cause that roller to move a greater distance than the other respective roller with a single sheet of proper thickness disposed between it and the drum, thereby causing one of said arms to pivot a greater amount than the other respective arm, thereby causing the light beam to reflect off said respective first and second arm mirrors such that said photodetector will not receive said light beam, thereby indicating a double or thicker sheet disposed between one of said rollers and said drum.

12. The sheet handling apparatus of claim 11, further comprising gap detecting means for detecting a gap between consecutive sheet materials, said gap detecting means being disposed adjacent said drum between said spaced apart arms, said gap detecting means providing a gap indicating signal.

13. The sheet handling apparatus of claim 12, further comprising incoming detector means for detecting incoming sheet material to said drum, said incoming detector being disposed adjacent said drum in a vicinity of said first arm roller, and a discharge detector means for detecting sheet material being discharged from said drum, said discharge detector means being disposed adjacent said drum in a vicinity of said second arm roller, said incoming and said discharge detector means providing a signal indicative of their respective sheet material detection.

14. The sheet handling apparatus of claim 11, further comprising a timing wheel mounted in rotative engagement with said drum for timing the consideration of an indicator signal from said photodetector at given intervals with respect to detection of a sheet between said first arm roller and said drum.

15. The sheet handling apparatus of claim 14, further comprising a counter connected to said timing wheel for counting a number of pulses from said timing wheel.

16. The sheet handling apparatus of claim 15, further comprising enabling means connected to said counter and the photodetector, said enabling means actuating said counter to pass on a control signal when said counter has reached a predetermined count.

17. The sheet handling apparatus of claim 16, further comprising a gate means disposed adjacent said drum at a discharge section thereof, for directing double or thicker sheet material toward a reject path, and for directing proper sheet material toward an acceptance path.

18. The sheet handling apparatus of claim 17, wherein said gate means further comprises a solenoid and spring return control apparatus connected to said gate means for moving said gate means between a reject and an acceptance path position.

19. The sheet handling apparatus of claim 16, further comprising logic means connected to said gate means and said counter for processing various received detector signals for providing a signal to control the gate means for directing discharged sheet material toward a reject or an acceptance path.

20. The sheet handling apparatus of claim 19, further comprising a delay connected between said logic means and said gate means for delaying said signal from said logic means to said gate means in order to allow enough time for sheet material disposed between said first arm roller and said drum to be discharged by said drum.

* * * * *